(12) United States Patent
Van Rheenen

(10) Patent No.: US 6,555,615 B2
(45) Date of Patent: Apr. 29, 2003

(54) REMOVABLE COATING COMPOSITION AND PREPARATIVE METHOD

(75) Inventor: Paul Ralph Van Rheenen, Warminster, PA (US)

(73) Assignee: Rohm and Haas Company, Philadelphia, PA (US)

( * ) Notice: Subject to any disclaimer, the term of this patent is extended or adjusted under 35 U.S.C. 154(b) by 160 days.

(21) Appl. No.: 09/788,938

(22) Filed: Feb. 20, 2001

(65) Prior Publication Data

US 2002/0010234 A1 Jan. 24, 2002

Related U.S. Application Data

(60) Provisional application No. 60/186,880, filed on Mar. 3, 2000.

(51) Int. Cl.⁷ .............................................. C08L 79/00
(52) U.S. Cl. ........................ 524/606; 524/457; 524/425; 524/610; 229/245
(58) Field of Search ................................ 524/457, 425, 524/606, 610; 229/245

(56) References Cited

U.S. PATENT DOCUMENTS

| | | | |
|---|---|---|---|
| 4,626,559 A | 12/1986 | Sadler et al. | 523/122 |
| 5,010,131 A | 4/1991 | Wagner | 524/457 |
| 5,604,282 A | 2/1997 | Grogan et al. | 524/232 |
| 5,672,379 A | 9/1997 | Schall et al. | 427/137 |
| 5,804,627 A | 9/1998 | Landy et al. | 524/314 |
| 5,820,993 A | 10/1998 | Schall et al. | 428/447 |
| RE36,032 E | 1/1999 | Tao et al. | 514/58 |

FOREIGN PATENT DOCUMENTS

| | | |
|---|---|---|
| EP | 0 911 375 A1 | 4/1999 |
| JP | XP 002168145 | 10/1980 |
| JP | Sho55-162647 | 11/1980 |
| JP | Hei 865326 | 7/1995 |
| JP | 09095631 | 4/1996 |
| JP | Hei 8-65326 * | 4/1997 |

OTHER PUBLICATIONS

Emulsion Polymerization of Acrylic Monomers, Feb. 1967, Rohm and Haas Company, Special Products Department; SP–154.

* cited by examiner

*Primary Examiner*—David W. Wu
*Assistant Examiner*—William K Cheung
(74) *Attorney, Agent, or Firm*—Richard B. Clikeman

(57) ABSTRACT

The invention relates to a removable coating and a method for preparing that removable coating. The method comprises applying to a surface of a substrate a removable coating composition including an aqueous dispersion of film forming polymer and amphoteric surfactant having isoelectric point at pH=3 to pH=8.

14 Claims, No Drawings

REMOVABLE COATING COMPOSITION AND PREPARATIVE METHOD

CROSS REFERENCE TO RELATED PATENT APPLICATIONS

This is a non-provisional application of prior pending U.S. provisional application serial No. 60/186,880 filed Mar. 3, 2000.

The present invention relates to a coating composition that can be applied to the surface of a substrate to form a coating that provides protection to that surface against a variety of adverse environmental conditions, yet is easily removable as a continuous sheet. The present invention further relates to a method of preparing the coating, as well as the use of the coating as a removable coating when applied to the surface of such substrates as metal, glass, plastic, coated metal, coated glass, coated plastic, fiberglass, ceramics, mica, paper, and wood.

A variety of coatings are known in the art. Many of these coatings are polymer based, and are applied to the surfaces of substrates such as metal, glass, and plastic which may or may not already be coated with one or more coating compositions. While many of these coatings are intended to be permanent, there is also a need for coatings that, for a period of time, provide protection to surfaces against deterioration due to adverse environmental conditions, such as, for example, contact with sharp objects, with objects bearing transferable color bodies, and with acid rain and other airborne and waterborne contaminants. Although the time interval during which the coating must provide protection may be as long as months, or even years, it is further desirable that such temporary coatings be removable when the level of protection they provide is no longer needed, or perhaps no longer desired.

The need for removable protective coatings exists, for example, during the production, storage, and distribution of vehicles, appliances, computers, furniture, sporting equipment, and the parts from which they are manufactured, as well as building material. An example of an industry having stringent requirements for peelable coatings is the automotive industry. In the automotive industry, a need exists for a removable protective coating to protect the automobile against weathering, contamination from the atmosphere, chemical attack or accidental damage during manufacturing, handling, storage and transit. Absent protective coating, the vehicle's paint is vulnerable to significant in-house mutilation and physical damage on the assembly line. During assembly of the vehicle, the paint finish may be inadvertently dinged, chipped and scratched as the workers use their tools to assemble the various parts of the vehicle. When such damage occurs, the vehicle's paint finish must undergo costly and time consuming touch-up procedures. Therefore, it is very advantageous to have the vehicle's paint finish protected by a coating. In a similar manner, the glass surfaces (e.g., windows) and plastic surfaces (e.g., tail lights and dashboards) require protection to minimize costs associated with remediation of damage, or even rejection by wholesalers, retailers, and the ultimate customers.

Because it is acceptance by the ultimate customer that is at stake, it is not enough to protect an automobile on the assembly line. Vulnerable surfaces of automobiles, and other vehicles must also be protected during prolonged outdoor storage and transportation. During such storage and transportation, the coating must be highly resistant to the onslaught of a host of deleterious environmental factors, including rain, acid rain, flying objects, ultraviolet (UV) radiation, and a variety of airborne and waterborne contaminants. To maintain its high degree of resistance, the protective coating must not be easily penetrable or swellable by water. To maintain a "just off the assembly line" appearance to the coated vehicle, the coating should resist dirt pick-up. Finally, when the time comes to reveal the still pristine surface, it is highly desirable to be able to quickly and smoothly remove the entire coating, leaving no residue, without recourse to labor intensive processes, use of any additional materials (e.g., solvents, acids, bases, and aqueous detergents), or generation of waste streams.

Although the automotive industry was chosen to illustrate the needs and requirements for removable coatings, these same needs and requirements also exist to a greater or lesser degree in industries dealing with, for example, other vehicles, appliances, computers, furniture, sporting equipment, building material, and the parts from which those finished products are manufactured.

When outdoor exposure is not at issue, the performance requirements for the peelable coating may be less stringent. If, for example, it is desired that an existing floor be protected while workers are carrying out construction activities in an interior space, it is advantageous to provide the floor with a peelable coating. Here, acid rain is not an issue and it is desirable to have a coating composition that provides a non-tacky protective surface, at low cost.

One early attempt to provide a temporary protective coating was the use of a wax coating on a painted automobile body. Wax provided a weatherproof and, to some extent, damage-resistant layer. However, the application of wax can be time consuming and difficult and its removal typically requires the use of organic solvents, creating hazardous conditions in the workplace as well as in the general environment.

Another type of removable, protective film composition is disclosed in U.S. Pat. No. 5,010,131. This film is disclosed for use in paint spray booths to protect the booth and equipment therein from paint overspray. The thermally releasable coating composition comprises water, a film-former, a filler, an alkaline source, and a blowing agent. Film-formers disclosed are selected from the group consisting of vinyl acetate copolymer emulsions, sugar, soap, certain organic salts, and polyvinyl alcohol. The film is sprayed onto a surface and allowed to dry. After the film has become contaminated with paint overspray, it is removed by action of a pressurized spray of hot water (at least 88° C.). The action of the hot water activates the blowing agent which helps to release the film from substrates. Thus, the film is not peelable without recourse to taking special measures. Further, the removal process results in the presence of potentially hazardous particulate waste material in process water. This creates significant waste removal problems for the practitioner.

A protective coating removable by re-wetting with water is disclosed in U.S. Pat. No. 5,604,282, for application to the surfaces of automobiles, airplanes, and counter tops. The aqueous coating composition includes poly(alkyl acrylate), for film forming and water resistance, and poly(vinyl alcohol) for water penetration. Release agents such as silicon polymers and hydrocarbon waxes are also present, along with surfactants, dispersants, and plasticizers. While the coatings derived from these compositions resist water penetration initially, they are specifically designed to be penetrated during prolonged contact with water such that they can be swollen to some degree and removed. The removal step, therefore, is time consuming. The release agents are not water soluble, necessitating the use of detergents in the water wash during removal, leading to creation of waste streams that must be treated. Further, the penetration of water through the coating over time provides a pathway for waterborne contaminants to contact the surfaces ostensibly being protected. In particular, acid rain penetration to a surface exposes that surface to corrosion and other chemical reactions that cause permanent damage.

Japanese patent JP87047463 discloses paper labels bearing pressure sensitive adhesive that may be removed cleanly from substrates and that resist becoming increasingly difficult to remove with aging. The polymers used in the adhesive composition are acrylic emulsion polymers. The polymers have glass transition temperatures of 0° C. or lower, and are not crosslinked. The adhesive composition further includes a plasticizer. An amphoteric surfactant may also be present and is described as improving anchoring power of the adhesive to the paper label so that transfer of the adhesive from the paper to the substrate does not occur on label removal. Paper labels are formed by applying a thin layer of the adhesive composition to paper. Once the paper label is applied to a substrate, the paper sheet provides a degree of protection, albeit very limited, to the adhesive layer. Removal of the adhesive layer as a single continuous sheet is also made possible by the presence of the paper sheet to which it adheres more strongly than it does to the substrate. Of course, the paper will disintegrate rapidly during outdoor exposure, and is therefore not suited for such use. Although suitable for use in paper labels, these adhesive polymer compositions lack the surface hardness necessary in protective films. In the absence of the paper layer, dirt and other foreign objects would stick to or even penetrate and corrupt such films. Moreover, absent the paper layer, removal of the adhesive layer as a single sheet would be impossible, and residue would remain on the substrate necessitating a cleaning step using solvent, aqueous detergent systems, and the like. In short, the adhesive coating of Azuma would be wholly unacceptable as a peelable coating.

A peelable coating composition for temporary protection of painted or bare metal surfaces of vehicles is disclosed in Kitamura, et al., laid open patent application JP-A-09095631. The peelable coating composition is an aqueous dispersion of a copolymer derived from ethylenically unsaturated monomers. It is preferred that one of the ethylenically unsaturated monomers bear carboxy functionality and be present at a relatively low level. Also included in the dispersion is polyvalent metal compound for the purpose of creating crosslinks by interaction with the carboxy groups of the polymer during drying of the film. The crosslinks are formed to impart dirt resistance to the film and allow the film to be removed without disintegrating. Kitamura teaches that the polyvalent metal cation must be present in the amount of at least 0.01 mole per 100 grams of polymer if the coating is to be peelable from the substrate. Kitamura further cautions that levels of polyvalent cation greater than 0.20 mole per 100 grams of polymer have deleterious effect upon the coating, causing penetration of water with resultant disintegration of the film and physical and chemical attack of the substrate surface. Unfortunately, these films can still be difficult to remove while providing only partial protection, especially against certain airborne and waterborne contaminants. For example, the automotive industry has stringent requirements for keeping the pH of the protective coating in the range 8–11 in spite of prolonged exposure to acid rain. Such requirements cannot be met by the compositions of Kitamura.

The present invention provides for long term protection of substrates from foreign objects, from the deleterious effects of weathering, and from attack by pollutants such as acid rain. Further, when the stringent requirements of prolonged external exposure are not at issue, the present invention provides for simpler, less costly coating compositions. Thus, long term protection is afforded by coating compositions that, once applied to a substrate, provide protective film that retains its protective properties until removal to expose the undamaged surface. At that point, the protective film is easily removed as a single sheet, leaving no residue.

The invention relates to a peelable coating composition, comprising:

a. an aqueous dispersion of at least one polymer,
   wherein said polymer has a Tg of greater than 0° C. to 40° C.;
b. at least one amphoteric release agent having an isoelectric point at pH 3 to pH 8;
c. greater than 0.20 moles/100 grams polymer to 2.00 moles/100 grams polymer of at least one base capable of maintaining said coating composition from pH 8 to pH 11; and
d. optionally, at least one polyvalent metal cation;
   wherein the sum of the amounts of said base and said polyvalent metal cation is greater than 0.20 moles/100 grams of said polymer to 2.00 moles/100 grams of said polymer.

The invention also relates to a peelable coating composition, comprising:

a. an aqueous dispersion of at least one polymer,
   wherein said polymer:
   i. has a Tg of –60° C. to 0° C.; and
   ii. comprises, as polymerized units, 0.1 to 6% by weight, based on the total weight of said polymer, of at least one carboxy functional monomer;
b. at least one amphoteric release agent having an isoelectric point at pH 3 to pH 8;
c. greater than 0.20 moles/100 grams polymer to 2.00 moles/100 grams polymer of at least one base capable of maintaining said coating composition from pH 8 to pH 11; and
d. at least one polyvalent metal cation;
wherein the sum of the amounts of said base and said polyvalent metal cation is greater than 0.20 moles/100 grams of said polymer to 2.00 moles/100 grams of said polymer.

The invention further relates to a peelable coating composition, comprising:

a. an aqueous dispersion of at least one polymer,
   wherein said polymer has a Tg of greater than 0° C. to 40° C.; and
b. at least one amphoteric release agent having an isoelectric point at pH 3 to pH 8;
wherein said peelable coating composition is substantially free of base and polyvalent metal cation.

The invention is directed to a method of preparing a peelable coating, comprising the steps of:

(1) applying to the surface of a substrate a coating composition comprising:
   a. an aqueous dispersion of at least one polymer,
      wherein said polymer has a Tg of greater than 0° C. to 40° C.;
   b. at least one amphoteric release agent having an isoelectric point at pH 3 to pH 8;
   c. greater than 0.20 moles/100 grams polymer to 2.00 moles/100 grams polymer of at least one base capable of maintaining said coating composition from pH 8 to pH 11; and d. optionally, at least one polyvalent metal cation;

wherein the sum of the amounts of said base and said polyvalent metal cation is greater than 0.20 moles/100 grams of said polymer to 2.00 moles/100 grams of said polymer; and (2) permitting said coating composition to dry.

Additionally, the invention is directed to a method of preparing a peelable coating, comprising the steps of:

(1) applying to the surface of a substrate a coating composition comprising:
   a. an aqueous dispersion of at least one polymer, wherein said polymer:
      i. has a Tg of −60° C. to 0° C.; and
      ii. comprises, as polymerized units, 0.1 to 6% by weight, based on the total weight of said polymer, of at least one carboxy functional monomer;
   b. at least one amphoteric release agent having an isoelectric point at pH 3 to pH 8;
   c. greater than 0.20 moles/100 grams polymer to 2.00 moles/100 grams polymer of at least one base capable of maintaining said coating composition from pH 8 to pH 11; and
   d. at least one polyvalent metal cation;

wherein the sum of the amounts of said base and said polyvalent metal cation is greater than 0.20 moles/100 grams of said polymer to 2.00 moles/100 grams of said polymer; and (2) permitting said coating composition to dry.

The invention is further directed to a method of preparing a peelable coating, comprising the steps of:

(1) applying to the surface of a substrate a coating composition comprising:
   a. an aqueous dispersion of at least one polymer, wherein said polymer has a Tg of greater than 0° C. to 40° C.; and
   b. at least one amphoteric release agent having an isoelectric point at pH 3 to pH 8;

wherein said coating composition is substantially free of base and polyvalent metal cation; and (2) permitting said coating composition to dry.

In one aspect of the present invention, wherein said polymer has a Tg of greater than 0° C. to 40° C., said polymer may optionally include, as polymerized units, 0.1 to 6% by weight, based on the total weight of said polymer, of at least one carboxy functional monomer.

In yet another aspect, said amphoteric release agent is a compound selected from the group consisting of amino carboxylic acid, amphoteric imidazoline derivative, betaine, fluorocarbon and siloxane versions thereof, and mixtures thereof.

In a still further aspect, said base is selected from the group consisting of calcium carbonate, zinc oxide, magnesium oxide, calcium hydroxide, and mixtures thereof.

In an additional aspect of the present invention, said polyvalent metal cation is a material selected from the group consisting of $Mg^{++}$, $Sr^{++}$, $Ba^{++}$, $Ca^{++}$, $Zn^{++}$, $Al^{+++}$, and $Zr^{4+}$ and mixtures thereof.

The polymer of the present invention is referred to interchangeably herein as "polymer", "binder polymer", and "binder". The specific method by which a binder polymer is prepared is not of particular importance. Binder polymers may be prepared via bulk and solution polymerization, and by aqueous dispersion, suspension, and emulsion polymerization, or any other method that would produce the desired polymer, either dispersed in water or capable of being dispersed in water. A preferred method for preparing the binder polymers to be used in the peelable coating compositions of the present invention is aqueous emulsion polymerization. Polymers thus prepared are usually stabilized by adding anionic, nonionic, or cationic surfactants, or by the incorporation of anionic or cationic moieties into the polymer itself during synthesis. The emulsion polymerization can be carried out by a number of processes such as those described in Blackley, D. C. *Emulsion Polymerisation*; Applied Science Publishers: London, 1975; Odian, G. *Principles of Polymerization*; John Wiley & Sons: New York, 1991; *Emulsion Polymerization of Acrylic Monomers*; Rohm and Haas, 1967.

Anionically stabilized polymer particles can, for example, be prepared from a wide range of acrylic and methacrylic monomers, isobornyl (meth)acrylate, isodecyl (meth)acrylate, oleyl (meth)acrylate, palmityl (meth)acrylate, stearyl (meth)acrylate, 2-hydroxyethyl (meth)acrylate, 3-hydroxypropyl (meth)acrylate, 4-hydroxybutyl (meth)acrylate, glycidyl (meth)acrylate; acid functional monomers, such as, acrylic acid, methacrylic acid, crotonic acid, itaconic acid, fumaric acid and maleic acid; monomethyl itaconate; monomethyl fumarate; monobutyl fumarate; maleic anhydride; acrylamide or substituted acrylamides; (meth)acrylonitrile; sodium vinyl sulfonate; phosphoethyl (meth)acrylate; acrylamido propane sulfonate; diacetone acrylamide; acetoacetylethyl methacrylate; acrolein and methacrolein; dicyclopentadienyl methacrylate; dimethyl metaisopropenylbenzyl isocyanate; isocyanatoethyl methacrylate; styrene or substituted styrenes; butadiene; ethylene; vinyl acetate or other vinyl esters; vinyl monomers, such as, for example, vinyl halide, preferably vinyl chloride, vinylidene halide, preferably vinylidene chloride, N-vinyl pyrrolidone; amino monomers, such as, for example, N,N-dimethylaminoethyl (meth)acrylate, N,N-dimethylaminopropyl methacrylamide, and oxazolidinoethyl methacrylate. Throughout this document, the word fragment "(meth)acryl" refers to both "methacryl" and "acryl". For example, (meth)acrylic acid refers to both methacrylic acid and acrylic acid, and methyl (meth)acrylate refers to both methyl methacrylate and methyl acrylate.

When polymers contain carboxy moieties, those moieties may be present in either acid or salt form. When multiple carboxy groups occur on a single polymer chain, they may be present solely in the acid or salt form, or as mixtures of both forms. In aqueous dispersion, the extent to which these carboxy functional polymers are in acid or salt form will depend upon the extent to which the carboxylic acid groups have been neutralized to the corresponding salt by addition of basic compounds such as calcium carbonate, zinc oxide, magnesium oxide, calcium hydroxide, ammonium hydroxide, lithium hydroxide, potassium hydroxide, sodium hydroxide, amines, and mixtures thereof.

Optionally, a low level of a multi-ethylenically unsaturated monomer such as, for example, 0–5% by weight based on the weight of the dry polymer of allyl (meth)acrylate, diallyl phthalate, 1,4-butylene glycol di(meth)acrylate, 1,6-hexanediol di(meth)acrylate, and trimethylolpropane tri(methyl)acrylate may be used subject to maintaining a sufficiently low level of crosslinking that, in the case of solution polymers, unmanageable viscosity is not attained, or that, in the case of emulsion polymers, effective film formation is not compromised. Multi-ethylenically unsaturated monomers react to form covalent crosslinks between chains. Further, most of the crosslinking often occurs in the coating composition before the coating film is formed. In this way, the preponderance of covalent crosslinks are within the water dispersed particles of binder polymer and not between them. In contrast, many the ionic crosslinks resulting from the interaction of carboxy moieties of the binder polymer with polyvalent metal cation tend to occur during and after the coating film has formed, as well as during storage of the peelable coating composition. In this way the polyvalent metal cation provides a post-crosslinking function to improve the durability of the resultant coating. The terms "coating", "film", and "coating film" are used interchangeably herein, and refer to the film that forms and dries as a layer on the surface of a substrate.

Conventional surfactants may be used to stabilize the emulsion polymerization systems before, during, and after polymerization of monomers. These conventional surfactants will usually be present at levels of 0.1 percent to 6 percent by weight based on the weight of total monomer. At least one anionic, nonionic, or amphoteric surfactant may be used, or mixtures thereof. Alternatively, all, or a portion, of the surfactant activity may be provided by initiator fragments, such as those of persulfates, when the fragments become incorporated into the polymer chain. Examples of anionic emulsifiers include sodium lauryl sulfate, sodium dodecyl benzene sulfonate, dioctylsulfosuccinate, sodium polyoxyethylene lauryl ether sulfate, and sodium salt of tert-octylphenoxyethoxypoly(39)ethoxyethyl sulfate. Examples of nonionic surfactants include glycerol aliphatic esters, oleic acid monoglyceride, polyoxyethylene aliphatic esters, polyoxyethylene glycol monostearate, polyoxyethylene cetyl ether, polyoxyethylene glycol monolaurate, polyoxyethylene glycol monooleate, polyoxyethylene glycol stearate, polyoxyethylene higher alcohol ethers, polyoxyethylene lauryl ether, polyoxyethylene nonylphenol ether, polyoxyethylene octylphenol ether, polyoxyethylene oleyl ether, polyoxyethylene stearyl ether, polyoxyethylenesorbitan aliphatic esters, polyoxyethylenesorbitan monolaurate, polyoxyethylenesorbitan monooleate, polyoxyethylenesorbitan monopalmitate, polyoxyethylenesorbitan monostearate, polyoxyethylenesorbitan trioleate, polyoxyethylenesorbitan tristearate, polyoxyethylenesorbitol tetraoleate, stearic acid monoglyceride, tertoctylphenoxyethylpoly(39)ethoxyethanol, and nonylphenoxyethylpoly(40)ethoxyethanol.

Amphoteric surfactants, such as those described herein, may also be utilized to stabilize particles of the polymer during and after aqueous emulsion polymerization, or other dispersion polymerizations. For the purpose of stabilizing particles of polymer in aqueous systems, amphoteric surfactants may be used at levels of 0.1 percent to 6 percent by weight based on the weight of total monomer. If the amphoteric surfactant is also being used to make the coating more easily removable, these or higher levels may be used.

Initiation of emulsion polymerization may be carried out by the thermal decomposition of free radical precursors, also called initiators herein, which are capable of generating radicals suitable for initiating addition polymerization. Suitable thermal initiators such as, for example, inorganic hydroperoxides, inorganic peroxides, organic hydroperoxides, and organic peroxides, are useful at levels of from 0.05 percent to 5.0 percent by weight, based on the weight of monomers. Free radical initiators known in the art of aqueous emulsion polymerization include water-soluble free radical initiators, such as hydrogen peroxide, tert-butyl peroxide; alkali metal (sodium, potassium or lithium) or ammonium persulfate; or mixtures thereof. Such initiators may also be combined with reducing agents to form a redox system. Useful reducing agents include sulfites such as alkali metal meta bisulfite, or hyposulfite, sodium thiosulfate, or sodium formaldehyde sulfoxylate. The free radical precursor and reducing agent together, referred to as a redox system herein, may be used at a level of from about 0.01% to 5%, based on the weight of monomers used. Examples of redox systems include t-butyl hydroperoxide/sodium formaldehyde sulfoxylate/Fe (III) and ammonium persulfate/sodium bisulfite/sodium hydrosulfite/Fe (III). The polymerization temperature may be 10° C. to 110° C., depending upon such things as free radical initiator decomposition constant and reaction vessel pressure capabilities.

Frequently, a low level of chain transfer agent such as a mercaptan (for example: n-octyl mercaptan, n-dodecyl mercaptan, butyl or methyl mercaptopropionate, mercaptopropionic acid at 0.05 to 6% by weight based on total weight of monomer) is employed to limit the formation of any significant gel fraction or to control molecular weight.

The amphoteric release agents useful in the method of the invention include amphoteric surfactants. Amphoteric surfactants bear both acidic and basic functionality and are well known in the art [see, for example, Amphoteric Surfactants, ed. B. R. Bluestein and C. L. Hilton, Surfactant Series Vol. 12 Marcel Dekker NY, N.Y. (1982)]. Amphoteric surfactants useful in the present invention include those having an isoelectric point at pH=3 to pH=8. The isoelectric point occurs at a characteristic pH for each amphoteric surfactant, and is that pH at which the negative charge on the surfactant molecule is exactly balanced by the positive charge on that same molecule. Characteristics of amphoteric surfactants vary as the pH is adjusted. For example, solubility in water is usually highest when the pH is significantly above or below that of the isoelectric point, and lowest in the region (within one or two pH units) of the isoelectric point. The manner in which a given amphoteric surfactant is prepared is not particularly relevant to the claimed invention. Therefore, preparative methods for amphoteric surfactants will generally not be discussed herein.

The amphoteric surfactants useful in the present invention include those having weakly acidic functionality, especially carboxy functionality. In contrast, amphoteric surfactants having more strongly acidic functionality, for example sulfonic acid moieties, are less suitable because the acidic moiety is always ionized whether in acid of salt form such that the water solubility remains high over a wide range of pH because the acidic moiety is fully ionized down to very low pH. Hence, these materials have isoelectric points lower than 3 and are very water soluble over the conventional pH range of water based coatings and are easily washed out of dry films causing loss of release. The carboxy moieties may be present in fully protonated (carboxylic acid) form, as salts with at least one type of cation, and as mixtures of protonated and salt forms. The carboxylic acid moieties may also be part of inner salts. As used herein, inner salt refers to a molecule bearing an anionically charged moiety, the counter ion (i.e., cation) for which is also a moiety attached to the that same molecule. Useful classes of amphoteric surfactant include aminocarboxylic acids, amphoteric imidazoline derivatives, betaines, and macromolecular ampholytes. Amphoteric surfactants from any of these classes may be further substituted with fluorocarbon substituents, siloxane substituents, or combinations thereof. Amphoteric surfactants representative of these classes are disclosed herein in non-limiting lists. Additional useful amphoteric surfactants can be found in Amphoteric Surfactants, ed. B. R. Bluestein and C. L. Hilton, Surfactant Series Vol. 12 Marcel Dekker NY, N.Y. (1982). It is preferred that the amphoteric surfactant be present in the amount of 0.1 to 6.0 percent by weight, based on the dry weight of binder polymer. More preferably, the amphoteric surfactant is present at 0.25 to 5.0 percent by weight, while the most preferable range is 0.5 to 4.0 percent by weight. All of these ranges for the amount of amphoteric surfactant are inclusive and combinable.

Any of the aminocarboxylic acids may have carboxy moieties present in either protonated form or in carboxylate form. Where more than one carboxy group is present on a molecule, those carboxy groups may all be in protonated form, in carboxylate form, or they may be present as some mixture of protonated and carboxylate forms. Furthermore, the ratio of protonated to unprotonated carboxy moieties may vary from one molecule to another, otherwise identical, molecule in a given system. Cations present as counter ions for the carboxylate moieties include cations of lithium, sodium, potassium, amines (i.e., ammonium cations derived from protonation or other quaternary substitution of amines), zinc, zirconium, calcium, magnesium, and aluminum. Any of the aminocarboxylic acids may have amino moieties present in either protonated (ammonium) or free amine form (i.e., as deprotonated primary, secondary, or tertiary amine). Where more than one amino group is present on a molecule, those amino groups may all be in protonated form, in free amine form, or they may be present as some mixture of protonated and free amine forms. Again, the ratio of protonated to unprotonated amine moieties may vary from one molecule to another, otherwise identical, molecule in a given system. Anions present as counter ions for the ammonium moieties include chloride, bromide, sulfate, carbonate, hydroxide, formate, acetate, propionate and other carboxylate anions.

Suitable aminocarboxylic acids include: α-aminocarboxylic acids having the general formula R—NH—CH$_2$COOH, where R=C4–C20 linear or branched, alkyl, alkenyl, or fluoro or silicone functional hydrophobe group; and β-aminocarboxylic acids having the general structures: R—NH—CH$_2$CH$_2$COOH and RN(CH$_2$CH$_2$COOH)$_2$, where R=C4–C20 linear or branched, alkyl, alkenyl, or fluoro or silicone functional hydrophobe group, β-aminocarboxylic acids are available from Henkel Corporation, King of Prussia, Pa., under the name DERIPHAT™ (see Bulletin A32118). Unless otherwise stated, the DERIPHAT™ ampholytes have the general formula R—NHCH$_2$CH$_2$COOH, where R=residue of coconut fatty acids, residue of tallow fatty acids, lauric acid, myristic acid, oleic acid, palmitic acid, stearic acid, linoleic acid, other C4–C20 linear or branched, alkyl, alkenyl, and mixtures thereof DERIPHAT™ ampholytes useful in the present invention include: sodium-N-coco-β-aminopropionate (DERIPHAT™ 151, flake 97% active); N-coco-β-aminopropionic acid (DERPHAT™ 151C, 42% solution in water); N-lauryl/myristyl-β-aminopropionic acid (DERIPHAT™ 17° C., 50% in water); disodium-N-tallow-β-iminodipropionate, RN(CH$_2$CH$_2$COONa)$_2$, (DERIPHAT™ 154, flake 97% active); disodium-N-lauryl-β-iminodipropionate (DERIPHAT™ 160, flake 97% active); and partial sodium salt of N-lauryl-β-iminodipropionic acid, RN(CH$_2$CH$_2$COOH)(CH$_2$CH$_2$COONa), (DERIPHAT™ 16° C., 30% in water). Useful polyaminocarboxylic acids include RC(=O)NHC$_2$H$_4$(NHC$_2$H$_4$)$_n$NHCH$_2$COOH and R-substituted ethylenediaminetetraacetic acid (EDTA), where R=C4–C20 linear or branched, alkyl or alkenyl, and n=0–3.

Amphoteric imidazoline derivatives useful in the claimed invention include those derived from variously substituted 2-alkyl-2-imidazolines and 2-alkenyl-2-imidazolines which have nitrogen atoms at the 1 and 3 positions of the five-membered ring and a double bond in the 2,3 position. The alkyl or alkenyl group may be a C4–C20 linear or branched chain. The amphoteric imidazoline derivatives are produced via reactions in which the imidazoline ring opens hydrolytically under conditions allowing further reaction with such alkylating agents as sodium chloroacetate, methyl (meth) acrylate, ethyl (meth)acrylate, and (meth)acrylic acid. Useful amphoteric surfactants derived from the reaction of 1-(2-hydroxyethyl)-2-(R$_1$)-2-imidazolines with acrylic acid or acrylic acid esters, where R$_1$=residue of coconut fatty acids, are:

cocoamphopropionate, R$_1$—C(=O)NHCH$_2$CH$_2$N (CH$_2$CH$_2$OH)(CH$_2$CH$_2$COONa);
cocoamphocarboxypropionic acid, R$_1$—C(=O) NHCH$_2$CH$_2$N(CH$_2$CH$_2$COOH) (CH$_2$CH$_{2O}$CH$_2$CH$_2$COOH);
cocoamphocarboxypropionate, R$_1$—C(=O)NHCH$_2$CH$_2$N (CH$_2$CH$_2$COONa)(CH$_2$CH$_{2O}$CH$_2$CH$_2$COONa);
cocoamphoglycinate, R$_1$—C(=O)NHCH$_2$CH$_2$N (CH$_2$CH$_{2O}$H)(CH$_2$COONa); and
cocoamphocarboxyglycinate, [R$_1$—C(=O)NHCH$_2$CH$_2$N$^+$ (CH$_2$CH$_2$OH)(CH$_2$COONa)$_2$]OH$^-$.

Surface-active inner salts containing at least one quaternary ammonium cation and at least one carboxy anion are called betaines. The nomenclature for betaines derives from the single compound (trimethylammonio)acetate which is called betaine and exists as an inner salt. Betaines useful as amphoteric surfactants in the claimed invention include compounds of the general formulae: R$_2$N$^+$(CH$_3$)$_2$CH$_2$COO$^-$; R$_2$CONHCH$_2$CH$_2$CH$_2$N$^+$(CH$_3$)$_2$CH$_2$COO$^-$; and R$_2$—O—CH2-N$^+$(CH$_3$)$_2$CH$_2$COO$^-$, where R$_2$=C4–C20 linear or branched, alkyl, alkenyl, or fluoro or silicone functional hydrophobe group. Specific examples of betaines include N-dodecyl-N,N-dimethylglycine and cocamidopropyl betaine and (MONATERIC™ CAB available from Mona Industries).

Typically, when fluorocarbon substituents are attached to amphoteric surfactants, those substituents are perfluoroalky groups, branched or unbranched, having 6 to 18 carbon atoms. However, these substituents may instead be partially fluorinated. They may also bear aryl functionality. Examples of fluorocarbon amphoteric surfactants include fluorinated alkyl FLUORAD™ FC100 and fluorinated alkyl ZONYL™ FSK, produced by 3M and Dupont, respectively.

Typical siloxane functional amphoteric surfactants have, for example, the structures:

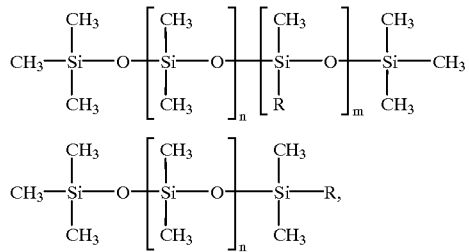

wherein R represents an amphoteric moiety and m+n=3 to 50. An example is the polyalkyl betaine polysiloxane copolymer ABIL™ B9950 available from Goldschmidt Chemical Corporation.

Macromolecular amphoteric surfactants useful in the claimed invention include: proteins, protein hydrolysates, derivatives of protein hydrolysates, starch derivatives, and synthetic amphoteric oligomers and polymers, such as those described in Chapter 5 of Amphoteric Surfactants, ed. B. R. Bluestein and C. L. Hilton, Surfactant Series Vol. 12 Marcel Dekker NY, NY(1982). Of particular utility are those macromolecular ampholytes bearing carboxy functionality.

Depending upon the Tg of the binder polymer and the level of base used to in the peelable coating composition of the claimed invention, the presence of polyvalent metal cation may be advantageous or necessary. It is believed that the polyvalent metal cation forms ionic bonds with the carboxy moieties, thereby inducing crosslinking among polymer chains. Such crosslinking reduces or eliminates undesirable build of adhesion to the surface of the substrate being protected, increases resistance to penetration of the peelable coating by deleterious agents in the environment, and improves the integrity of the coating so that it can be removed as a single continuous film. Although necessary when the Tg of the binder polymer is 0° C. or lower, this ionic crosslinking via polyvalent metal cations is often not desirable when the Tg of the polymer exceeds 0° C., and no base is present (i.e., where protection against acid rain is not needed). On the other hand, when sufficient base to prevent acid rain damage (i.e., greater than 0.20 moles of base per 100 grams of binder polymer) is present in peelable coating compositions based on binder polymer having Tg greater than 0° C., the presence of polyvalent metal cation improves the durability of the peelable coating. This improvement in durability is particularly beneficial at high pH (8–11). Any polyvalent metal cation capable of ionic bonding with a carboxylic acid group may be used to achieve crosslinking, but preferred polyvalent metal cations include $Mg^{++}$, $Sr^{++}$, $Ba^{++}$, $Ca^{++}$, $Zn^{++}$, $Al^{+++}$, $Zr^{4+}$, and mixtures thereof.

Aspects of the present invention include a base capable of maintaining the coating composition from pH 8 to pH 11. Any base capable of maintaining the coating within this pH range may be used. Examples of bases include calcium carbonate, zinc oxide, magnesium oxide, and calcium hydroxide, and mixtures thereof. When a base is used, the base is present in a preferred amount of greater than 0.20 moles/100 grams polymer to 2.00 moles/100 grams polymer, more preferably, 0.30 moles/100 grams polymer to 1.75 moles/100 grams polymer, and, most preferably, 0.40 moles/100 grams polymer to 1.50 moles/100 grams polymer. All of these ranges for the amount of base are inclusive and combinable.

When base is present in the peelable coating composition, the presence of polyvalent metal cation may be advantageous, or even necessary. In some instances, the cationic portion of a particular base may be polyvalent and capable of further functioning as a polyvalent metal cation. In those instances, the sum of the amounts of base and polyvalent metal cation is preferred to be greater than 0.20 moles/100 grams polymer to 2.00 moles/100 grams polymer, more preferably, 0.30 moles/100 grams polymer to 1.75 moles/100 grams polymer, and, most preferably, 0.40 moles/100 grams polymer to 1.50 moles/100 grams polymer. All of the ranges for the sum of the amounts of base and polyvalent metal cation are inclusive and combinable.

When the Tg of the binder polymer is greater than −60° C. to 0° C. the polymer includes, as polymerized units, carboxy functional monomer in the amount 0.1 to 6.0 percent by weight, based on the total weight of dry polymer, preferably 0.5 to 6.0 percent by weight, and more preferably 1.0 to 5.0 percent by weight. In addition, the peelable coating composition includes polyvalent metal cation in the amount 0.001 to 0.1 moles polyvalent metal cation per 100 grams dry polymer, preferably 0.01 to 0.08 moles per 100 grams dry polymer, and more preferably 0.02 to 0.05 moles per 100 grams dry polymer. All of the ranges for the amount of carboxy functional monomer and for the amount of polyvalent metal cation are inclusive and combinable.

When the Tg of the binder polymer is greater than 0° C. to 40° C., and the peelable coating composition includes greater than 0.20 moles/100 grams polymer to 2.00 moles/100 grams polymer of at least one base capable of maintaining said coating composition from pH 8 to pH 11, said polymer may optionally include, as polymerized units, carboxy functional monomer in the amount 0.1 to 6.0 percent by weight, based on the total weight of dry polymer, preferably 0.5 to 6.0 percent by weight, and more preferably 0.1 to 5.0 percent by weight. In addition, the corresponding peelable coating composition may, optionally, contain polyvalent metal cation in the amount 0.001 to 0.1 moles polyvalent metal cation per 100 grams dry polymer, preferably 0.01 to 0.08 moles per 100 grams dry polymer, and more preferably 0.02 to 0.05 moles per 100 grams dry polymer. All of the ranges for the amount of carboxy functional monomer and for the amount of polyvalent metal cation are inclusive and combinable.

When stringent performance requirements, such as resistance to acid rain, are not associated with a particular application, low cost peelable compositions are possible. In these low cost peelable coating compositions, the Tg of the binder polymer is greater than 0° C. to 40° C., and the composition is free of base and free of polyvalent metal cation. It has been surprisingly found that these low cost coating compositions are peelable without recourse to the use of polyvalent metal cation. Said binder polymer may optionally include, as polymerized units, carboxy functional monomer in the amount 0.0 to 6.0 percent by weight, based on the total weight of dry polymer, preferably 0.0 to 6.0 percent by weight, and more preferably 0.0 to 2.5 percent by weight. All of these ranges for the amount of carboxy functional monomer are inclusive and combinable.

Optionally, a variety of additives may be incorporated into the peelable coating composition. Such additives include thickeners, plasticizers, coalescents, ultraviolet light stabilizers, concealing pigments, coloring pigments, inorganic or organic fillers and extenders, dispersion agents, wetting agents, defoaming agents, preservatives, and mold inhibitors.

All the examples herein are intended for illustrative purposes only. They are not intended to limit the spirit or scope of the present invention which is defined by the claims.

EXAMPLES

Used herein, the letter "g" denotes grams".

All weight percents for amphoteric surfactants are based on the total of the solids weight of the amphoteric surfactant and the solids weight of the polymer.

Test Method: Peel Test

The peel test described here was used for determining the ease of removal, or peelability, of films formed from the compositions in all of the examples. Coatings were drawn down on substrates using a 3 mil Bird applicator and allowed to dry overnight at room temperature. The films were then hand peeled from the glass and rated on a scale of 1 to 10 for ease of removal. A rating of 1 means the film is very difficult to remove and tends to break into pieces instead of peeling away as a continuous sheet. A rating of 5 means the film can be removed as a continuous sheet, but some effort is required. A rating of 10 means once peeling is started, the film comes off almost effortlessly. Herein, "substrate" denotes a material, the surface of which is coated with the coating composition to form the film for Peelability testing. The terms "ease of removal" and "peelability" are used interchangeably herein.

Latex Polymers

All of the latex Polymers selected for use in the Examples (Table I) are available from Rohm and Haas Company of Philadelphia, Pa. TS=total solids as weight percent solids based on total weight of latex; Tg=glass transition temperature.

Used herein, "Tg" is an abbreviation for glass transition temperature. The glass transition temperature, Tg, of a polymer is the temperature at which a polymer transitions from a rigid, glassy state at temperatures below Tg to a fluid or rubbery state at temperatures above Tg. The Tg of a polymer is typically measured by differential scanning calorimetry (DSC) using the mid-point in the heat flow versus temperature transition as the Tg value. A typical heating rate for the DSC measurement is 20 Centigrade degrees per minute.

Table I. Latex Polymers

TABLE I

Latex Polymers

| Latex Polymer | Description | TS (%) | Tg (° C.) |
|---|---|---|---|
| RHOPLEX ™ P-376 | Styrene/acrylic latex polymer | 50 | 15 |
| RHOPLEX ™ E-1801 | Acrylic latex | 61.5 | 17 |
| ROVACE ™ 661 | Vinyl acetate/acrylic copolymer latex | 55 | 15 |
| ROVACE ™ E-3357 | Vinyl acetate homopolymer emulsion polymer | 61.5 | 17 |
| ELASTENE ™ A-10 | Acrylic latex; 0.49 milliequivalent of carboxyl groups per gram polymer | 62 | −40 |

Amphoteric Surfactants.

The amphoteric surfactants used in the Examples are listed in Table II.

TABLE II

Amphoteric Surfactants

| Amphoteric Surfactants | Description | Supplier |
|---|---|---|
| DERIPHAT ™ 151C | amino carboxylic acid: N-coco-β-aminopropionic acid, TS = 40%. | Henkel Corp., King of Prussia, PA |
| MONATERIC ™ CAB | betaine: cocamidopropyl betaine, TS = 30% | Mona Industries, Lake Forest, California |
| MIRANOL ™ CM-SF | fatty imidazoline derivative: cocoamphopropionate, TS = 37% | Rhone-Poulenc, North Brunswick, New Jersey |
| ABIL ™ B9950 | polyalkyl betaine polysiloxane compolymer, TS = 30% | Goldschmidt Chemical Corp., Hopewell, Virginia |
| FLUORAD ™ FC100 | fluorinated alkyl, TS = 25% | 3M, St. Paul, Minnesota |
| ZONYL ™ FSK | fluorinated alkyl | Dupont, Wilmington, Delaware |

Substrates.

A wide variety of substrates was used in testing the compositions of the examples for peelability. Substrates utilized were: aluminum, glass, 5C Charts (special paper charts coated with a crosslinked thermoset coating; Leneta Co., Mahwah, N.J.), PLEXIGLAS™ acrylic glazing (Elf Atochem North America, Inc., Philadelphia, Pa.), clear polystyrene sheet, fiberglass shower stall, melamine plastic counter top, clear polycarbonate sheet, and CNCT7™ polyurethane automotive clear coat (PPG, Pittsburgh, Pa.).

Plasticizer.

The plasticizer BENZOFLEX™ 50 is a product of Velsicol Chemical, Rosemont, Ill.).

Crosslinking Agent.

The crosslinking agent ZINPLEX 15 is available from Ultra Additives, Inc., Paterson, N.J. ZINPLEX™ 15 is a zinc ammonium carbonate water solution containing the equivalent of 15% ZnO solids.

Coalescent.

Coalescent TEXANOL™ is available from Eastman Chemical Co., Kingsport, Tenn.

Defoamers.

Defoamers DREWPLUS™ Y-281 and DREWPLUS™ L-435 are available from Ashland Chemical Drew Division, Dothan, Ala. FOAMEX™ 825 defoamer is a product of Tego Chemie.

Dispersant.

Dispersant TAMOL™ 963 is a product of Rohm and Haas Co., Philadelphia, Pa.

Base.

Base OMYACARB™ UF calcium carbonate is a product of Omya Inc., Proctor, Vt. Herein, the terms "base", "buffer" and "buffering agent" are used interchangeably to mean a material that maintains pH at a characteristic range.

Light Stabilizer.

Light stabilizer TINUVIN™ 1130 is a product of Ciba Specialty Chemicals, Los Angeles, Calif.

Thickener.

Thickener ACRYSOL™ RM 2020 is a product of Rohm and Haas Co., Philadelphia, Pa.

Biocide.

Biocide ROZONE™ 2000 is a product of Rohm and Haas Co., Philadelphia, Pa.

Preparation of Coating Compositions

Coating components were mixed together using an overhead stirrer until a homogeneous coating composition was formed. Table III lists the components of coating compositions used in each example along with the solids weight percent of amphoteric surfactant, based on the weight of latex polymer solids. The following calculation was used to determine weight percent of amphoteric surfactant contained in the coating composition:

$$\text{Wt. \% AS} = \frac{(\text{wt. } AS) \times [(AS \text{ \% solids})/100\%] \times 100\%}{(\text{wt. polymer latex}) \times [(\text{polymer latex \% solids})/100\%]},$$

where AS denotes "amphoteric surfactant" herein.

TABLE III

Components of Coating Compositions

| Example Number | Component | Component Weight (g) | Wt. % |
|---|---|---|---|
| 1 (Comparative) | RHOPLEX ™ P-376 | 100 | |
| 2 | RHOPLEX ™ P-376 | 100 | |
| | DERIPHAT ™ 151C | 2.5 | 2.0 |
| 3 (Comparative) | RHOPLEX ™ E-1801 | 100 | |
| 4 | RHOPLEX ™ E-1801 | 100 | |
| | DERIPHAT ™ 151C | 0.77 | 0.5 |
| 5 | RHOPLEX ™ E-1801 | 100 | |
| | DERIPHAT ™ 151C | 1.54 | 1.0 |
| 6 | RHOPLEX ™ E-1801 | 100 | |
| | DERIPHAT ™ 151C | 3.1 | 2.0 |
| 7 (Comparative) | ROVACE ™ 661 | 100 | |
| 8 | ROVACE ™ 661 | 100 | |
| | DERIPHAT ™ 151C | 1.38 | 1.0 |
| 9 (Comparative) | ROVACE ™ E-3357 | 100 | |
| | BENZOFLEX ™ 50 | 8 | |

TABLE III-continued

Components of Coating Compositions

| Example Number | Component | Component Weight (g) | Wt. % |
|---|---|---|---|
| 10 | ROVACE ™ E-3357 | 100 | |
| | BENZOFLEX ™ 50 | 8 | |
| | DERIPHAT ™ 151C | 1.38 | 1.0 |
| 11 | RHOPLEX ™ E-1801 | 10 | |
| | ELASTENE ™ A-10 | 40 | |
| | ZINPLEX ™ 15 | 4.2 | |
| | DERIPHAT ™ 151C | 1.94 | 2.5[a] |
| 12 (Comparative) | ROVACE ™ E-3357 | 100 | |
| | BENZOFLEX ™ 50 | 8 | |
| 13 | ROVACE ™ E-3357 | 100 | |
| | BENZOFLEX ™ 50 | 8 | |
| | DERIPHAT ™ 151C | 1.38 | 1.0 |
| 14 | ROVACE ™ E-3357 | 100 | |
| | BENZOFLEX ™ 50 | 8 | |
| | MONATERIC ™ CAB | 1.84 | 1.0 |
| 15 | ROVACE ™ E-3357 | 100 | |
| | BENZOFLEX ™ 50 | 8 | |
| | MIRANOL ™ CM-SF | 1.49 | 1.0 |
| 16 | ROVACE ™ E-3357 | 100 | |
| | BENZOFLEX ™ 50 | 8 | |
| | ABIL ™ B9950 | 1.83 | 1.0 |
| 17 | ROVACE ™ E-3357 | 100 | |
| | BENZOFLEX ™ 50 | 8 | |
| | FLUORAD ™ FC100 | 2.2 | 1.0 |
| 18 | ROVACE ™ E-3357 | 100 | |
| | BENZOFLEX ™ 50 | 8 | |
| | ZONYL ™ FSK | 1.17 | 1.0 |
| 19 (Comparative) | ROVACE ™ 661 | 100 | |
| | TEXANOL ™ | 1.4 | |
| | DREWPLUS ™ Y-281 | 0.53 | |
| 20 | ROVACE ™ 661 | 100 | |
| | TEXANOL ™ | 1.4 | |
| | DREWPLUS ™ Y-281 | 0.53 | |
| | DERIPHAT ™ 151C | 1.38 | 1.0 |
| | ABIL ™ B9950 | 1.83 | 1.0 |

All weight % values derived by dividing the solids weight of the amphoteric surfactant by the solids weight of the polymer.
[a]The weight % value of 2.5 is based on the total dry weight of both RHOPLEX ™ E-1801 and ELASTENE ™ A-10. This corresponds to a weight % value of 3.1 when based on ELASTENE ™ A-10 alone.

TABLE IV

Example 21 Base Concentrate Formulation Containing Calcium Carbonate at 70 Weight Percent, Based on Weight of Total Concentrate.

| Example Number | Component[a] | Component Weight (g) |
|---|---|---|
| 21 | Water (deionized) | 32.3 |
| | TAMOL ™ 963 dispersant | 1.32 |
| | DREWPLUS ™ L-435 defoamer | 0.33 |
| | OMYACARB ™ UF calcium carbonate | 79.2 |
| | Total Base Concentrate Formulation | 113.15 |

[a]The TAMOL ™ 963, DREWPLUS ™ L-435, and OMYACARB ™ UF were dispersed in water (32.3 g) using a high speed dispersator mill. The remaining components were then combined in the order listed with the resultant dispersion and agitated to form a homogeneous blend.

TABLE V

Example 22 Latex Polymer Concentrate Formulation Containing DERIPHAT ™ 151C and ZINPLEX ™ 15.

| Exmpl. No. | Component[a] | Component Weight (g) | Wt. %[a] |
|---|---|---|---|
| 22 | ELASTENE ™ A-10 | 160 | |
| | Water (deionized) | 7.6 | |
| | DERIPHAT ™ 151C | 7.6 | 3.1 |
| | FOAMEX ™ 825 defoamer | 0.6 | |
| | ZINPLEX ™ 15 | 16.8 | |
| | TINUVIN ™ 1130 light stabilizer | 0.992 | |
| | ACRYSOL ™ RM 2020 thickener | 4 | |
| | ROZONE ™ 2000 biocide | 0.34 | |
| | Total Weight | 197.93 | |

[b]Wt % = weight percent of component solids, based on latex polymer solids.

Example 23

To Example 22 Latex Polymer Concentrate (197.93 g) was added the Example 21 Base Concentrate (113.15 g), giving a coating composition containing calcium carbonate (0.80 mole per 100 g latex polymer solids), zinc ammonium carbonate (16.9 weight percent, based on latex polymer solids), and DERIPHAT™ 151C (3.1 weight percent, based on latex polymer solids).

Example 24
Low Tg Acrylic Latex with Zinc Crosslinking

To 40 grams of ELASTENE™ A-10 (TS=62%, Tg=−40° C., 0.49 milliequivalents carboxyl groups per gram of polymer), was added 4.1 grams of ZINPLEX™ 15, zinc ammonium carbonate crosslinker (16.5 weight percent, based on latex polymer solids), 1.94 grams of deionized water, and 1.94 grams of DERIPHAT™ 151C (3.1 weight percent, based on latex polymer solids).

Example 25

To Example 24 latex was added 7.1 grams of Example 22 Base Concentrate (70 weight % $CaCO_3$ dispersion) to give a formulation containing calcium carbonate at 20% by weight, based on polymer solids (0.20 moles per 100 g latex polymer solids).

Example 26

To Example 24 latex was added 14.2 grams of Example 22 Base Concentrate (70 weight % $CaCO_3$ dispersion) to give a formulation containing calcium carbonate at 40% by weight, based on polymer solids (0.40 moles per 100 g latex polymer solids).

Example 27

To Example 24 latex was added 28.34 grams of Example 22 Base Concentrate (70 weight % $CaCO_3$ dispersion) to give a formulation containing calcium carbonate at 80% by weight, based on polymer solids (0.80 moles per 100 g latex polymer solids).

Example 28

To Example 24 latex was added 56.7 grams of Example 22 Base Concentrate (70 weight % $CaCO_3$ dispersion) to give a formulation containing calcium carbonate at 160% by weight, based on polymer solids (1.60 moles per 100 g latex polymer solids).

Examples 1–10

Wide Range of Latex Polymer Compositions.

Examples 1–10 of Table VI show that addition of amphoteric surfactant to latex polymer compositions greatly improves the ease of removal of the resultant films from aluminum and glass surfaces. The improvement is observed for a wide variety of latex polymer types.

TABLE VI

Ease of Removal from Aluminum and Glass as a Function of Latex Polymer Composition and Level of Amphoteric Surfactant.

| Ex. No. | Latex Polymer Type | Percent Amphoteric Surfactant[a] | Ease of Removal[b] from Aluminum | Ease of Removal[b] from Glass |
|---|---|---|---|---|
| 1 | styrene/acrylic copolymer | 0 | 1 | 1 |
| 2 | styrene/acrylic copolymer | 2 | 8 | 9 |
| 3 | acrylic | 0 | 3 | 5 |
| 4 | acrylic | 0.5 | 9 | 9 |
| 5 | acrylic | 1.0 | 9 | 10 |
| 6 | acrylic | 2.0 | 10 | 10 |
| 7 | vinyl acetate/acrylic copolymer | 0 | 7 | 8 |
| 8 | vinyl acetate/acrylic copolymer | 1 | 9 | 10 |
| 9 | vinyl acetate homopolymer | 0 | 1 | 1 |
| 10 | vinyl acetate homopolymer | 1 | 9 | 9 |

[a]The amphoteric surfactant for the Table V examples is DERIPHAT ™ 151C. The percent is the weight percent of amphoteric surfactant solids, based on polymer solids.
[b]Rating system:
1-The film is very difficult to remove and tends to break into pieces instead of peeling away as a continuous sheet.
5-The film can be removed as a continuous sheet, but some effort is required.
10-Once peeling is started, the film comes off almost effortlessly.

Examples 12–18

Wide Range of Amphoteric Surfactants.

Examples 12–18 of Table VII show that a wide range of amphoteric surfactants may be used to achieve a high ease of removal from surfaces. In this case, the surface of glass was chosen for testing. The latex polymer chosen for these examples was ROVACE™ E-3357 to which had been added 8 percent by weight, based on total weight of polymer latex, of plasticizer BENZOFLEX™ 50.

TABLE VII

Ease of Removal from Glass as a Function of Amphoteric Surfactant Type.

| Ex. No. | Amphoteric Surfactant | Amphoteric Surfactant Weight %, based on polymer | Ease of Removal from Glass |
|---|---|---|---|
| 12 | none | 0 | 1 |
| 13 | DERIPHAT ™ 151C | 1.0 | 9 |
| 14 | MONATERIC ™ CAB | 1.0 | 8 |
| 15 | MIRANOL ™ CM-SF | 1.0 | 9 |
| 16 | ABIL ™ B9950 | 1.0 | 9 |
| 17 | FLUORAD ™ FC100 | 1.0 | 9 |
| 18 | ZONYL ™ FSK | 1.0 | 9 |

Examples 19–20

Wide Range of Substrates.

Examples 19 and 20 of Table VIII show that latex polymer containing amphoteric surfactant can be easily removed from the surfaces of a wide variety of substrates. The latex polymer chosen for these examples was ROVACE™ E-3357 to which had been added 1.4 percent by weight of coalescent TEXANOL™ and 0.53 percent by weight of defoamer DREWPLUS™ Y-281, both based on total weight of polymer latex. No amphoteric surfactant was add to the Example 19 composition. For Example 20, amphoteric surfactants DERIPHAT™ 151C and ABIL™ B9950 where each added at 1.0 weight percent (solids), based on solids weight of polymer latex.

TABLE VIII

Ease of Removal as a Function of Amphoteric Surfactant Level and Substrate Type.

| Substrate | Example 19 (no amphoteric surfactant) | Example 20 (DERIPHAT ™ 151C, 1%; ABIL ™ B9950, 1%) |
|---|---|---|
| Aluminum | 7 | 9 |
| Glass | 8 | 10 |
| 5C Chart | 5 | 8 |
| PLEXIGLAS ™ acrylic glazing | 1 | 7 |
| black vinyl substrate | 1 | 8 |
| clear polystyrene sheet | 6 | 9 |
| fiberglass shower stall | 8 | 10 |
| melamine plastic counter top | 8 | 10 |

Examples 11 AND 21

Formulation Containing Base

Example 21 utilizes a fully formulated peelable coating composition including a low Tg (40° C.) latex polymer ELASTENE™ A-10 and calcium carbonate base OMYACARB™ UF at 80 percent by weight, based on EIASTENE™ A-10 polymer solids. The coating composition of Example 11 is a less complicated formulation containing no base. Zinc crosslinking agent ZINPLEX™ 15 is present in both compositions at 16.9 weight percent based on ELASTENE™ A-10 polymer solids. Also present in both compositions is DERIPHAT™ 151C at 3.1 weight percent, based on ELASTENE™ A-10 polymer solids. The Example 11 composition is similar in its simplicity to the compositions of Examples 1–20. The data of Table IX show that incorporating high levels of base into simpler formulations can result in no loss of the improvements in peelabilty that were demonstrated for those simpler formulations. Films were dried overnight at 20° C.

TABLE IX

Ease of Removal from a Wide Variety of Substrates for Coating Formulation Containing Base.

| Substrate | Example 11 (DERIPHAT ™ 151C, 3.1%[a]) | Example 23 (DERIPHAT ™ 151C, 3.1%[a]; OMYACARB ™ UF, 80%) |
|---|---|---|
| Aluminum | 8 | 7 |
| Aluminum coated panel soaked in water 3 days, dried at room temperature for 6 hours. | 8 | 7 |
| Glass | 8 | 8 |
| 5C Chart | 8 | 8 |
| PLEXIGLAS ™ acrylic glazing | 8 | 8 |
| clear polystyrene sheet | 8 | 8 |

TABLE IX-continued

Ease of Removal from a Wide Variety of Substrates for Coating Formulation Containing Base.

| Substrate | Example 11 (DERIPHAT ™ 151C, 3.1%[a]) | Example 23 (DERIPHAT ™ 151C, 3.1%[a]; OMYACARB ™ UF, 80%) |
|---|---|---|
| clear polycarbonate sheet | 8 | 8 |
| CNCT7 ™ polyurethane automotive clear coat | 8 | 8 |

[a]The weight % of DERIPHAT ™ 151C is 3.1, based on the dry weight of polymer ELASTENE ™ A-10.

TABLE X

Effect of Base Level (Calcium Carbonate) on Ease of Removal

| Example | Base, CaCO₃ | Glass | Aluminum | 5C Chart |
|---|---|---|---|---|
| 24 | 0 | 8 | 9 | 8 |
| 25 | 20 | 8 | 9 | 8 |
| 26 | 40 | 8 | 8 | 8 |
| 27 | 80 | 7 | 8 | 8 |
| 28 | 160 | 4 | 4 | 4 |

TABLE XI

Effect of Base Level (Calcium Carbonate) on Blister Resistance and Ease of Removal after Water Exposure

| Example | Base, CaCO₃, Wt % on Polymer Solids | Blistering(a), 24 Hour Immersion | Initial Ease of Removal from Aluminum | Ease of Removal after 2 hours redrying at room temperature |
|---|---|---|---|---|
| 24 | 0 | None | 9 | 9 |
| 25 | 20 | None | 9 | 9 |
| 26 | 40 | None | 8 | 8 |
| 27 | 80 | None | 8 | 8 |
| 28 | 160 | Heavy | 4 | 6 |

(a)Films were formed using a 3 mil Bird applicator draw down on aluminum panels. The film was then dried for one day, followed by immersion in DI water for 24 hours.

Protective Properties of Filled Removable Coatings Against Acidic Exposure Conditions. Tests Against Acid Rain and Industrial Acid Fallout.

Panel Preparation

Coatings were drawn down on 5C charts using a 3 mil Bird applicator and allowed to dry over night. The coated panels were placed in a 140° F. oven for 30 minutes and drops of acid test solutions were place on the panels and the panels received 30 more minutes in the oven. Films were tested for a change in ease of removal in the areas where drops were applied and the panel was observed for any signs of damage from the acid test solutions.

Test Solutions

The following acidic text solutions were used.

1. pH 2 acid rain solution. 70/30 sulfuric acid/nitric acid diluted to pH 2.
2. Acid spot resistance.
   0.6 N sulfuric acid solution
   0.6 N hydrochloric acid
   0.6 N nitric acid
3. Smoke rain resistance.
   5 g 98%sulfuric acid, 19 g activated carbon, 6 g carbon black, 79 g water.

TABLE XII

Ease of Removal as Function of Acidic Conditions Simulating Acid Rain.

| Test Solution | Example 24 | Example 25 | Example 26 | Example 27 | Example 28 |
|---|---|---|---|---|---|
| Wt. % CaCO₃ | 0 | 20 | 40 | 80 | 160 |
| pH 2 | No change | No change | No change | No change | No change |
| 0.6 N Sulfuric acid | No change | No change | No change | No change | No change |
| 0.6 N Hydrochloric | No change | No change | No change | No change | No change |
| 0.6 N Nitric acid | Difficult to remove | No change | No change | No change | No change |
| Smoke rain | No change | No change | No change | No change | No change |

TABLE XIII

Damage to Films as Function of Acidic Conditions Simulating Acid Rain.

| Test Solution | Example 24 | Example 25 | Example 26 | Example 27 | Example 28 |
|---|---|---|---|---|---|
| Wt. % CaCO₃ | 0 | 20 | 40 | 80 | 160 |
| pH 2 | No damage to panel | No damage to panel | No damage to panel | No damage to panel | No damage to panel |
| 0.6 N Sulfuric acid | Medium damage to panel | Slight damage to panel | No damage to panel | No damage to panel | No damage to panel |
| 0.6 N Hydrochloric | No damage | No damage | No damage to panel | No damage to panel | No damage to panel |
| 0.6 N Nitric acid | Slight damage | Slight damage | No damage to panel | No damage to panel | No damage to panel |
| Smoke rain | No damage | No damage | No damage to panel | No damage to panel | No damage to panel |

I claim:

1. A peelable coating composition, comprising:
   a. an aqueous dispersion of at least one polymer, wherein said polymer has a Tg of greater than 0° C. to 40° C.;
   b. at least one amphoteric release agent having an isoelectric point at pH 3 to pH 8;
   c. greater than 0.20 moles/100 grams of said polymer to 2.00 moles/100 grams of said polymer of at least one base capable of maintaining said coating composition from pH 8 to pH 11; and
   d. optionally, at least one polyvalent metal cation;
   wherein the sum of the amounts of said base and said polyvalent metal cation is greater than 0.20 moles/100 grams of said polymer to 2.00 moles/100 grams of said polymer.

2. A peelable coating composition, comprising:
   a. an aqueous dispersion of at least one polymer, wherein said polymer:
      i. has a Tg of −60° C. to 0° C.; and
      ii. comprises, as polymerized units, 0.1 to 6% by weight, based on the total weight of said polymer, of at least one carboxy functional monomer;
   b. at least one amphoteric release agent having an isoelectric point at pH 3 to pH 8;
   c. greater than 0.20 moles/100 grams polymer to 2.00 moles/100 grams polymer of at least one base capable of maintaining said coating composition from pH 8 to pH 11; and
   d. at least one polyvalent metal cation;
   wherein the sum of the amounts of said base and said polyvalent metal cation is greater than 0.20 moles/100 grams of said polymer to 2.00 moles/100 grams of said polymer.

3. A peelable coating composition, comprising:
   a. an aqueous dispersion of at least one polymer, wherein said polymer has a Tg of greater than 0° C. to 40° C.; and
   b. at least one amphoteric release agent having an isoelectric point at pH 3 to pH 8;
   wherein said peelable coating composition is substantially free of said base and said polyvalent metal cation.

4. The composition of claim 1 or 3, wherein said polymer comprises, as polymerized units, 0.1 to 6% by weight, based on the total weight of said polymer, of at least one carboxy functional monomer.

5. The composition of claim 1, 2, or 3 wherein said amphoteric release agent is a compound selected from the group consisting of amino carboxylic acid, amphoteric imidazoline containing compound, betaine, fluorocarbon and siloxane versions thereof, and mixtures thereof.

6. The composition of claim 1 or 2, wherein said base is selected from the group consisting of calcium carbonate, zinc oxide, magnesium oxide, calcium hydroxide, and mixtures thereof.

7. The composition of claim 1 or 2, wherein said polyvalent metal cation is a material selected from the group consisting of $Mg^{++}$, $Sr^{++}$, $Ba^{++}$, $Ca^{++}$, $Zn^{++}$, $Al^{+++}$, $Zr^{4+}$ and mixtures thereof.

8. A method of preparing a peelable coating, comprising the steps of:
   (1) applying to the surface of a substrate a coating composition comprising:
      a. an aqueous dispersion of at least one polymer, wherein said polymer has a Tg of greater than 0° C. to 40° C.;
      b. at least one amphoteric release agent having an isoelectric point at pH 3 to pH 8;
      c. greater than 0.20 moles/100 grams polymer to 2.00 moles/100 grams polymer of at least one base capable of maintaining said coating composition from pH 8 to pH 11; and
      d. optionally, at least one polyvalent metal cation;
   wherein the sum of the amounts of said base and said polyvalent metal cation is greater than 0.20 moles/100 grams of said polymer to 2.00 moles/100 grams of said polymer; and
   (2) permitting said coating composition to dry.

9. A method of preparing a peelable coating, comprising the steps of:
   (1) applying to the surface of a substrate a coating composition comprising:
      a. an aqueous dispersion of at least one polymer, wherein said polymer:
         i. has a Tg of −60° C. to 0° C.; and
         ii. comprises, as polymerized units, 0.1 to 6% by weight, based on the total weight of said polymer, of at least one carboxy functional monomer;
      b. at least one amphoteric release agent having an isoelectric point at pH 3 to pH 8;
      c. greater than 0.20 moles/100 grams polymer to 2.00 moles/100 grams polymer of at least one base capable of maintaining said coating composition from pH 8 to pH 11; and
      d. at least one polyvalent metal cation;
   wherein the sum of the amounts of said base and said polyvalent metal cation is greater than 0.20 moles/100 grams of said polymer to 2.00 moles/100 grams of said polymer; and
   (2) permitting said coating composition to dry.

10. A method of preparing a peelable coating, comprising the steps of:
    (1) applying to the surface of a substrate a coating composition comprising:
       a. an aqueous dispersion of at least one polymer, wherein said polymer has a Tg of greater than 0° C. to 40° C.; and
       b. at least one amphoteric release agent having an isoelectric point at pH 3 to pH 8;
    wherein said coating composition is substantially free of said base and said polyvalent metal cation; and
    (2) permitting said coating composition to dry.

11. The method of claim 8 or 10, wherein said polymer comprises, as polymerized units, 0.1 to 6% by weight, based on the total weight of said polymer, of at least one carboxy functional monomer.

12. The method of claim 8, 9, or 10, wherein said amphoteric release agent is a compound selected from the group consisting of amino carboxylic acid, amphoteric imidazoline containing compound, betaine, fluorocarbon and siloxane versions thereof, and mixtures thereof.

13. The method of claim 8 or 9, wherein said base is selected from the group consisting of calcium carbonate, zinc oxide, magnesium oxide, calcium hydroxide, and mixtures thereof.

14. The method of claim 8 or 9, wherein said polyvalent metal cation is selected from the group consisting of $Mg^{++}$, $Sr^{++}$, $Ba^{++}$, $Ca^{++}$, $Zn^{++}$, $Al^{+++}$, $Zr^{4+}$ and mixtures thereof.

* * * * *